US009377655B2

(12) United States Patent
Kim et al.

(10) Patent No.: US 9,377,655 B2
(45) Date of Patent: Jun. 28, 2016

(54) LIQUID CRYSTAL DISPLAY

(71) Applicant: Samsung Display Co., Ltd., Yongin, Gyeonggi-Do (KR)

(72) Inventors: Sung Man Kim, Seoul (KR); Sung Hoon Kim, Seoul (KR); Man Hong Na, Seoul (KR); Min-Chul Song, Seoul (KR); Jun Ho Song, Seongnam-si (KR); Eu Gene Lee, Busan (KR); Sung-Hoon Lim, Gunsan-si (KR); Young Je Cho, Asan-si (KR); Sun-Kyu Joo, Suwon-si (KR); Soo Jung Chae, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 533 days.

(21) Appl. No.: 13/835,667

(22) Filed: Mar. 15, 2013

(65) Prior Publication Data

US 2013/0342782 A1 Dec. 26, 2013

(30) Foreign Application Priority Data

Jun. 21, 2012 (KR) .................. 10-2012-0066628

(51) Int. Cl.
*G02F 1/1339* (2006.01)
*G02F 1/1362* (2006.01)
*G02F 1/1343* (2006.01)

(52) U.S. Cl.
CPC ........ *G02F 1/13394* (2013.01); *G02F 1/13624* (2013.01); *G02F 1/136286* (2013.01); *G02F 2001/13396* (2013.01); *G02F 2001/134345* (2013.01)

(58) Field of Classification Search
CPC .......... G02F 1/13394; G02F 1/136286; G02F 1/1368; G02F 1/1339; G02F 1/134336; G02F 1/133345; G02F 1/13392; G02F 1/136213; G02F 1/1333; G02F 1/1343; G02F 1/134309; G02F 1/1362; G02F 2001/13398; G02F 2001/13396; G02F 2001/13629; G02F 1/133357; G02F 2201/40; H01L 29/41733; H01L 29/4908; H01L 29/78624; H01L 29/78669; H01L 29/78678; H01L 21/823456; H01L 21/823468; H01L 21/823814; H01L 21/82385; H01L 27/3276; G09G 3/3648; G09G 2300/0426; G09G 2300/0876; G09G 2310/0281
USPC ............. 349/43, 155, 138, 139, 46, 143, 156, 349/158, 187, 38, 39; 257/E29.273, 257/E29.291, E29.294; 438/151, 158; 345/87, 92
See application file for complete search history.

(56) References Cited

U.S. PATENT DOCUMENTS

| 6,211,937 | B1 | 4/2001 | Miyachi et al. |
| 7,468,776 | B2 * | 12/2008 | Tawaraya et al. ............. 349/155 |
| 2002/0070905 | A1 | 6/2002 | Kodate et al. |
| 2002/0093617 | A1 * | 7/2002 | Matsuyama et al. .......... 349/156 |

(Continued)

FOREIGN PATENT DOCUMENTS

| JP | 2000298280 A | 10/2000 |
| JP | 2003107490 A | 4/2003 |

(Continued)

*Primary Examiner* — Thoi Duong
(74) *Attorney, Agent, or Firm* — Cantor Colburn LLP

(57) ABSTRACT

A liquid crystal display includes: a first insulation substrate; a first gate conductor disposed on the first insulation substrate and in a same layer as a gate line and a second gate conductor disposed on the first insulation substrate and in the same layer as the gate line; a gate insulating layer disposed on the first gate conductor and the second gate conductor; a data conductor disposed on the gate insulating layer and in a same layer as a data line; a thin film transistor disposed on the first insulation substrate; a first spacer disposed on the first insulation substrate; and a second spacer disposed on the first insulation substrate, where heights or widths of the first and second spacers are different from each other and having different heights or widths, and the second spacer overlaps the first gate conductor and the second gate conductor.

36 Claims, 18 Drawing Sheets

(56) References Cited

U.S. PATENT DOCUMENTS

2012/0008080 A1 1/2012 Daishi
2013/0100386 A1* 4/2013 Kim et al. .................... 349/110

FOREIGN PATENT DOCUMENTS

| | | |
|---|---|---|
| JP | 2003140159 A | 5/2003 |
| JP | 2009069331 A | 4/2009 |
| KR | 1020050000105 A | 1/2005 |
| KR | 1020060095356 A | 8/2006 |
| KR | 1020070059303 A | 6/2007 |
| KR | 1020070108970 A | 11/2007 |
| KR | 100827853 B1 | 4/2008 |
| KR | 1020080032323 A | 4/2008 |
| KR | 1020090015437 A | 2/2009 |
| KR | 20100075023 A | 2/2010 |

* cited by examiner

LIQUID CRYSTAL DISPLAY

This application claims priority to Korean Patent Application No. 10-2012-0066628 filed on Jun. 21, 2012, and all the benefits accruing therefrom under 35 U.S.C. §119, the content of which in its entirety is herein incorporated by reference.

BACKGROUND (a) Field

Exemplary embodiments of the invention relate to a liquid crystal display.

(b) Description of the Related Art

A liquid crystal display is one of the most widely used types of flat panel display. The liquid crystal display typically includes two display panels, in which electric field generating electrodes are provided, and a liquid crystal layer disposed between the two display panels, and refers to a display device for controlling transmittance of light passing through the liquid crystal layer by applying a voltage to an electrode to change a direction of liquid crystal molecules of the liquid crystal layer.

The two display panels, e.g., an upper substrate and a lower substrate, of the liquid crystal display are supported by a spacer disposed between the two substrates. The spacer maintains a cell gap between the two substrates.

In general, in a case of a liquid crystal display formed in a liquid crystal dispensing type, the liquid crystal display is manufactured by providing liquid crystal on one substrate of the two substrates in the dispensing type, forming a seal line surrounding a periphery of a display area on the other substrate on which a column spacer is provided, and then attaching the upper substrate and the lower substrate.

When the column spacer overlaps an area that transmits light, an aperture ratio of the liquid crystal display may be decreased. Further, the aperture ratio varies depending on the position of the column spacer in a pixel area, and stain and the like may occur due to the difference in the aperture ratio, thereby deteriorating a display quality of the liquid crystal display.

In addition, when a contact area between the column spacer and an opposite substrate becomes narrow, support of the column spacer between the upper substrate and the lower substrate may become weak, and thus the smear, which may occur when a predetermined cell gap is not substantially maintained, may occur.

SUMMARY

Exemplary embodiments of the invention relate to a liquid crystal display including a column spacer that maintains a uniform cell gap, in which an aperture ratio and a display quality of the liquid crystal display are effectively prevented from being deteriorated.

An exemplary embodiment of a liquid crystal display includes: a first insulation substrate; a first gate conductor disposed on the first insulation substrate and in a same layer as a gate line and a second gate conductor disposed on the first insulation substrate and in the same layer as the gate line; a gate insulating layer disposed on the first gate conductor and the second gate conductor; a data conductor disposed on the gate insulating layer and in a same layer as a data line; a thin film transistor disposed on the first insulation substrate; and a spacer disposed on the first insulation substrate and overlapping the first gate conductor and the second gate conductor.

In an exemplary embodiment, the liquid crystal display may further include a first spacer disposed on the first insulation substrate and having different heights or widths from that of the spacer.

In an exemplary embodiment, the first spacer may overlap the thin film transistor.

In an exemplary embodiment, the liquid crystal display may further include a second substrate disposed opposite to the first insulation substrate, where the first spacer is in contact with surfaces of a plurality of thin films disposed on the second substrate.

In an exemplary embodiment, the spacer may overlap the data conductor.

In an exemplary embodiment, the liquid crystal display may further include a third spacer disposed on the first insulation substrate, where the third spacer may overlap the first gate conductor and the second gate conductor.

In an exemplary embodiment, the height of the first spacer may be greater than the height of the spacer.

In an exemplary embodiment, the width of the first spacer may be substantially the same as the width of the spacer.

In an exemplary embodiment, the height of the spacer may be greater than a height of the third spacer.

In an exemplary embodiment, the width of the spacer may be substantially the same as a width of the third spacer.

In an exemplary embodiment, the height of the first spacer may be substantially the same as the height of the spacer.

In an exemplary embodiment, the width of the first spacer may be different from the width of the spacer.

In an exemplary embodiment, the height of the spacer may be substantially the same as a height of the third spacer.

In an exemplary embodiment, the width of the spacer may be different from the width of the third spacer.

In an exemplary embodiment, the liquid crystal display may further include a plurality of pixels disposed substantially in a matrix form, where the first gate conductor may include a first gate line, the second gate conductor may include a second gate line, and the first gate line and the second gate line may be disposed between two adjacent pixel rows.

In an exemplary embodiment, the data conductor may be a part of a source electrode connected to the data line.

In an exemplary embodiment, the liquid crystal display may further include a third gate conductor disposed on the first insulation substrate and in the same layer as the gate line, where the spacer may overlap the third gate conductor.

In one or more exemplary embodiments of a liquid crystal display according to the invention, a column spacer is disposed overlapping at least one gate conductor provided on the same layer as a gate line and at least one data conduction provided on the same layer as the data line on a thin film transistor display panel, such that an aperture ratio of the liquid crystal display and a display quality are effectively prevented from being deteriorated, and the column spacer maintains a substantially uniform cell gap.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
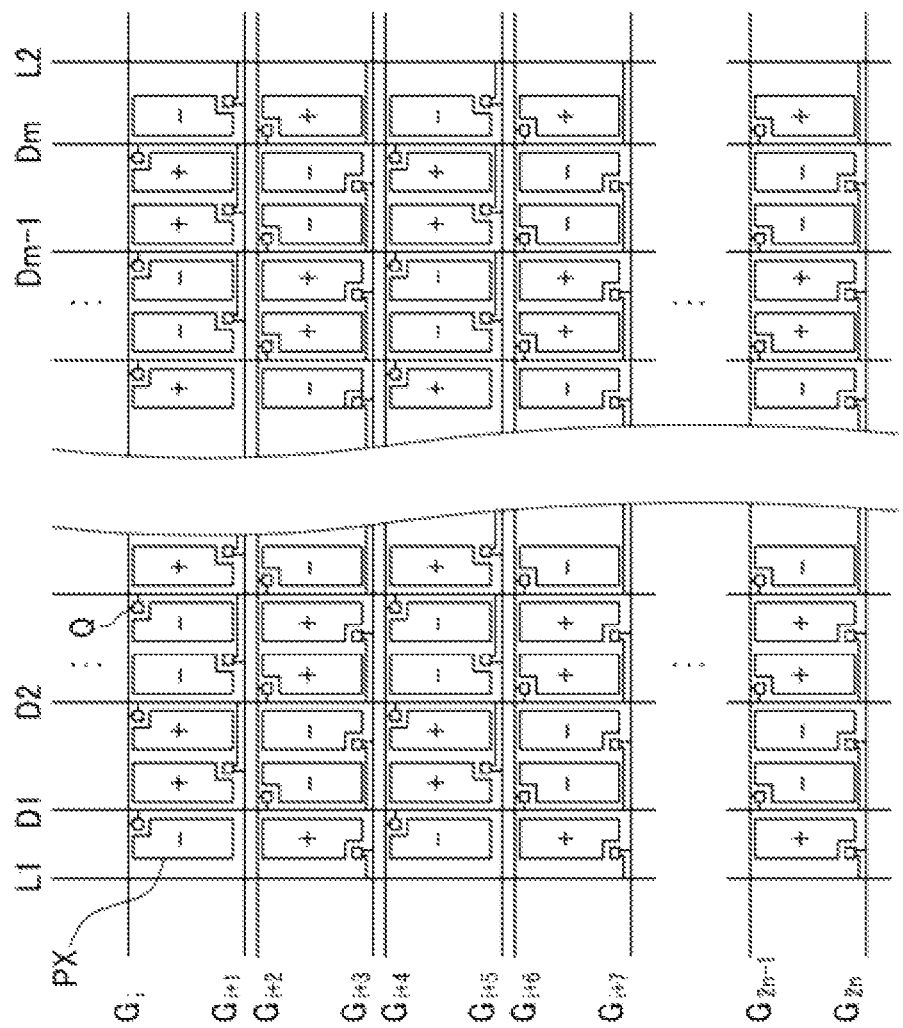
FIG. 1 is a block diagram of an exemplary embodiment of a liquid crystal display according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

First, an exemplary embodiment of a liquid crystal display according to the invention will be described with reference to FIG. 1.

FIG. 1 is a block diagram of an exemplary embodiment of a liquid crystal display according to the invention.

As shown in FIG. 1, an exemplary embodiment of the liquid crystal display according to the invention includes a plurality of display signal lines $G_1$ to $G_{2n}$, $D_1$ to $D_m$, L1, L2 (where n=1, 2, 3, ..., m=1, 2, 3, ...) and a plurality of pixels PX connected to the display signal lines and arranged substantially in a matrix form.

The display signal lines $G_1$ to $G_{2n}$, $D_1$ to $D_m$, L1, L2 include a plurality of gate lines, e.g., first to 2n-th gate lines $G_1$ to $G_{2n}$, for transmitting a gate signal (also referred to as a "scanning signal"), a plurality of data lines, e.g., first to m-th data lines $D_1$ to $D_m$, for transmitting a data signal and dummy lines, e.g., first and second dummy lines L1 and L2. The gate lines $G_1$ to $G_{2n}$ are arranged substantially in a row direction and substantially parallel to each other, and the data lines $D_1$ to $D_m$ and the dummy lines L1 and L2 are arranged substantially in a column direction and substantially parallel to each other. The first dummy line L1 extends in the proximity of the side of a liquid crystal panel assembly substantially in a row direction, and the second dummy line L2 extends in the proximity of the right side of the liquid crystal panel assembly substantially in the row direction. The first and second dummy lines L1 and L2 are substantially parallel to the data lines $D_1$ to $D_m$.

In an exemplary embodiment, each pixel includes a switching device Q connected to the display signal lines $G_1$ to $G_{2n}$ and $D_1$ to $D_m$ and the dummy lines L1 and L2, a liquid crystal capacitor (not shown) connected to the switching device and a storage capacitor (not shown). In an alternative exemplary embodiment, the storage capacitor may be omitted.

The switching device Q, such as a thin film transistor, for example, is provided in a lower display panel 100, which is a thin film transistor display panel, and the switching device is a three terminal device in which a control terminal and an input terminal thereof are connected to the gate lines $G_1$ to $G_{2n}$, the data lines D to $D_m$ and the dummy lines L1 and L2, respectively, and an output terminal thereof is connected to a liquid crystal capacitor and a storage capacitor.

In an exemplary embodiment, as shown in FIG. 1, a pair of gate lines $G_1$ and $G_2$, $G_3$ and $G_4$, ..., or $G_{2n-1}$ and $G_{2n}$, are disposed on the top and the bottom of pixels PX in a pixel row. In such an embodiment, each of the data lines $D_1$ to $D_m$ is disposed between pixels PX in two pixel columns. In such an embodiment, one data line is disposed between a pair of pixel rows. Connection between the gate lines $G_1$ to $G_{2n}$ and the pixels PX, and connection between the data lines $D_1$ to $D_m$ and the pixels PX will hereinafter be described in greater detailed.

In an exemplary embodiment, a plurality of pairs of gate lines $G_1$ to $G_{2n}$ connected to tops and bottoms of the pixels PX in pixel rows are connected to a pixel electrode (not shown) of a corresponding pixel PX through the switching device Q disposed on the top or the bottom of each pixel PX.

In such an embodiment, in odd numbered pixel rows, the switching devices Q located in a left side of the data lines $D_1$ to $D_m$ are connected to the gate lines $G_1$, $G_5$, $G_9$, ... located in the top of the odd numbered pixel rows, and the switching devices Q located in a right side of the data lines $D_1$ to $D_m$ are connected to the gate lines $G_2$, $G_6$, $G_{10}$, ... located in the bottom of the odd numbered pixel rows. In an exemplary embodiment, connection between the gate lines $G_3$, $G_7$, $G_{11}$, ... located in the top and the switching devices Q and connection between the gate lines $G_4$, $G_8$, $G_{12}$, ... located in the bottom and the switching devices Q in even numbered pixel rows are opposite to connection in the odd numbered pixel rows. In such an embodiment, the switching devices Q located in a right side of the data lines $D_1$ to $D_m$ are connected to the gate lines $G_3$, $G_7$, $G_{11}$, ... located in the top of the odd numbered pixel rows, and the switching devices Q located in a left side of the data lines $D_1$ to $D_m$ are connected to the gate lines $G_4$, $G_8$, $G_{12}$, ... located in the bottom of the odd numbered pixel rows.

The pixels PX located in the left side from the data lines $D_1$ to $D_m$ among the pixels PX in the odd numbered rows are connected to right adjacent data lines $D_1$ to $D_m$ through the switching devices Q, and the pixels PX located in the right side from the data lines $D_1$ to $D_m$ are connected to next adjacent data lines through the switching devices Q. The pixels PX located in the left side from the data lines $D_1$ to $D_m$ among the pixels PX in the even numbered rows are connected to right previous data lines through the switching devices Q, and the pixels PX located in the right side of the data lines $D_1$ to $D_m$ are connected to right adjacent data lines through the switching devices Q. The pixels PX located in a first column and the even numbered rows are connected to the first dummy line L1 connected to the last data line $D_m$, and the pixels PX located in a last column and the odd numbered rows are connected to the second dummy line L2 connected to the first data line $D_1$.

In an exemplary embodiment, as described above, the switching device Q of each pixel is substantially efficiently connected to the connected data lines $D_1$ to $D_m$ or dummy lines L1 and L2, and a connection length is substantially reduced or effectively minimized. In such an embodiment, a position of the switching device Q, as shown in FIG. 1, is changed for each pixel row, that is, the switching devices Q are disposed on right upper parts of the pixels located in the left side of the data lines $D_1$ to $D_m$ among pixel pairs located in the odd numbered rows, and the switching devices Q are formed on right lower parts of the pixels located in the right side of the data lines $D_1$ to $D_m$.

In an exemplary embodiment, positions of the switching devices Q of the pixels located in the even numbered rows are directly opposite to positions in the adjacent pixel rows. In such an embodiment, the switching devices Q are disposed on left lower parts of the pixels located in the left side of the data lines $D_1$ to $D_m$ among pixel pairs located in the even numbered rows, and the switching devices Q are disposed on left upper parts of the pixels located in the right side of the data lines $D_1$ to $D_m$.

In an exemplary embodiment, as shown in the connection between the pixels PX and the data lines $D_1$ to $D_m$ of FIG. 1, the switching devices Q of two pixels located between two adjacent data lines in each pixel row are connected to the same data line. In such an embodiment, the switching devices Q of two pixels disposed between two data lines in the odd numbered pixel row are connected to the data line located in the right side, and the switching devices Q of two pixels disposed between two data lines in the even numbered pixel row are connected to the data line located in the left side.

In such an embodiment, a data driver inversion is a column inversion. A data voltage applied to a data line constantly has the same polarity, and data voltages applied to two adjacent data lines have opposite polarities. In such an embodiment, an apparent inversion may be a 1×2 dot inversion.

As described above, when the appearance inversion becomes the dot inversion, a difference in the luminance generated due to a kickback voltage when the pixel voltage has a positive polarity and a negative polarity is dispersed, and thus vertical line defects are substantially reduced.

In such an embodiment, the number of data lines decreases by half, such that the manufacturing cost of the data driver is substantially reduced.

The invention is not limited to the illustrated exemplary embodiment of FIG. 1. In an alternative exemplary embodiment, connection between pixel electrodes 191 and the data lines $D_1$ to $D_m$ and gate lines $G_1$ to $G_{2n}$ in the odd numbered rows, and connection between pixel electrodes 191 and the data lines $D_1$ to $D_m$ and gate lines $G_1$ to $G_{2n}$ in the even numbered rows may be reversed, and may have another connection relations.

Then, an exemplary embodiment of a liquid crystal display according to the invention will be described with reference to FIGS. 2 to 6.

Figure 2:
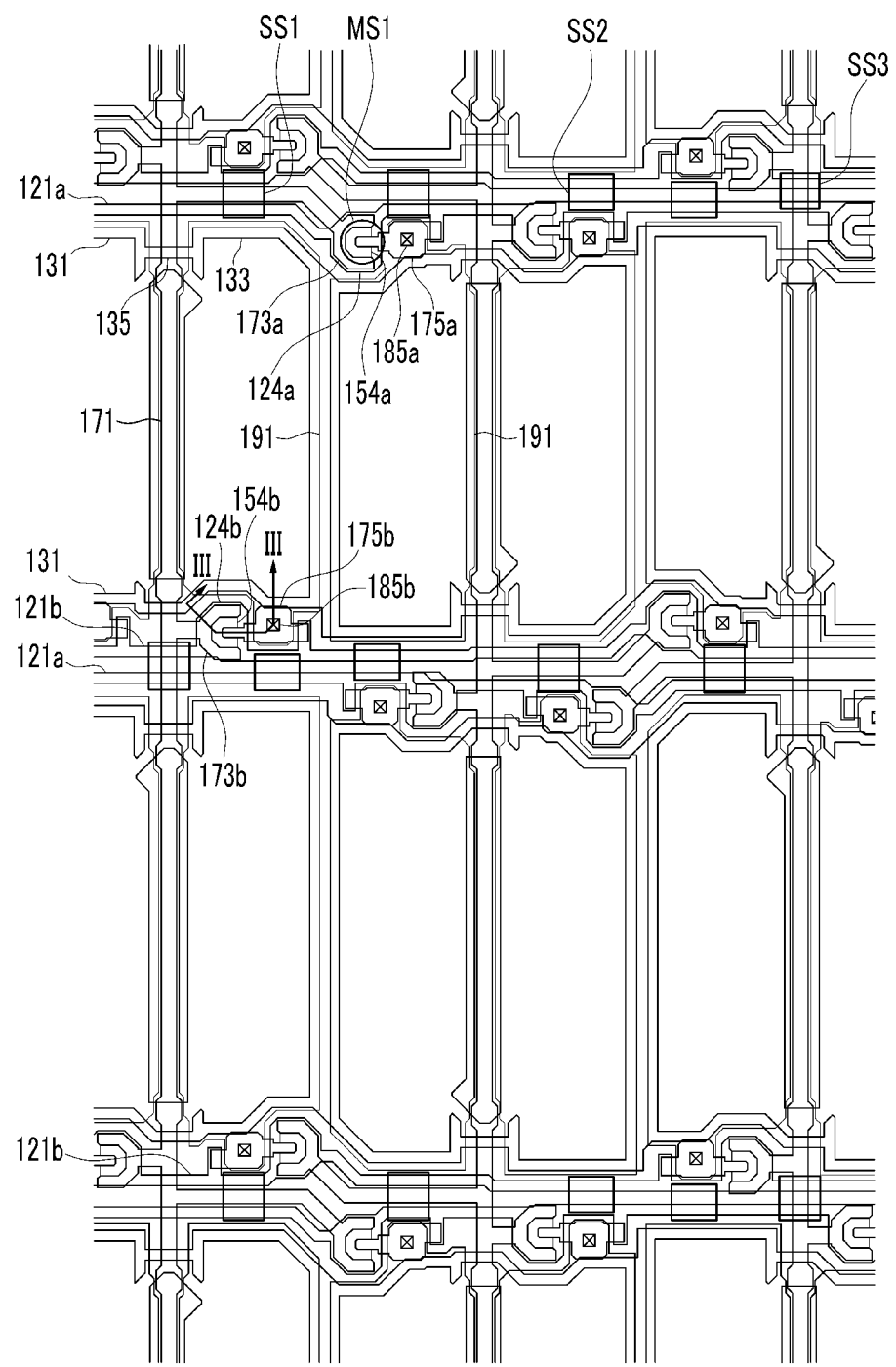
FIG. 2 is a top plan view of an exemplary embodiment of a liquid crystal display according to the invention.
Figure 3:
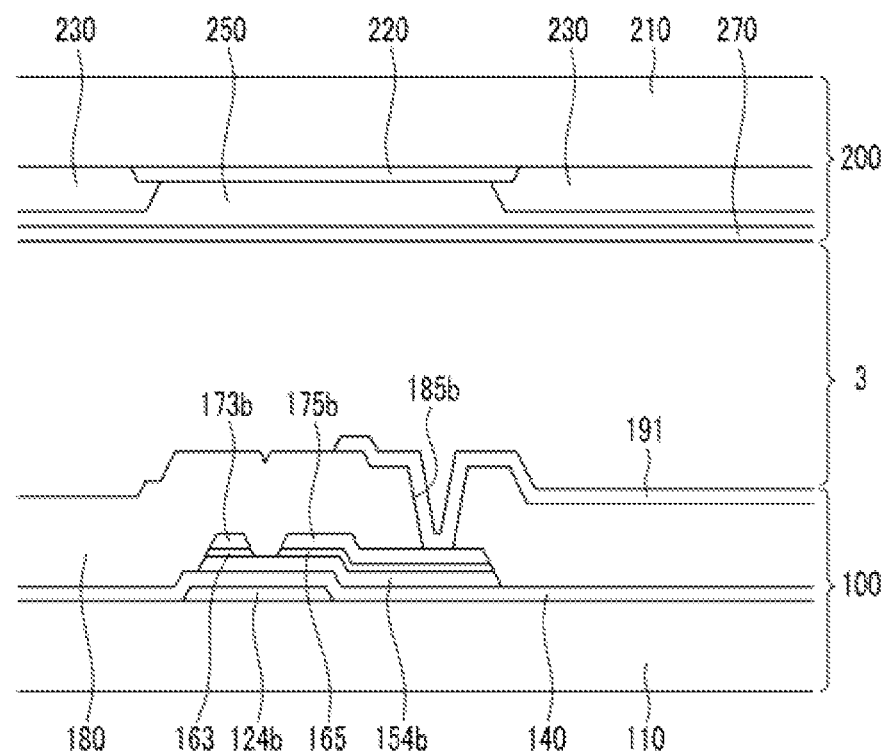
FIG. 3 is a cross-sectional view taken along line III-III of the liquid crystal display shown in FIG. 2.
Figure 4:
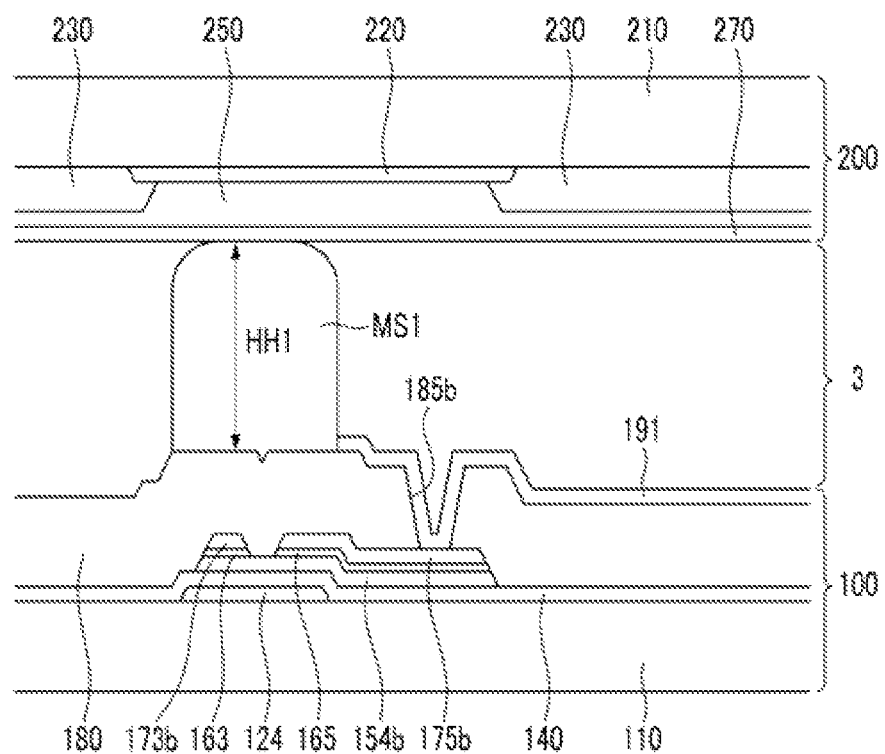
FIG. 4 is a partial cross-sectional view illustrating an exemplary embodiment of a liquid crystal display according to the invention.
Figure 5:
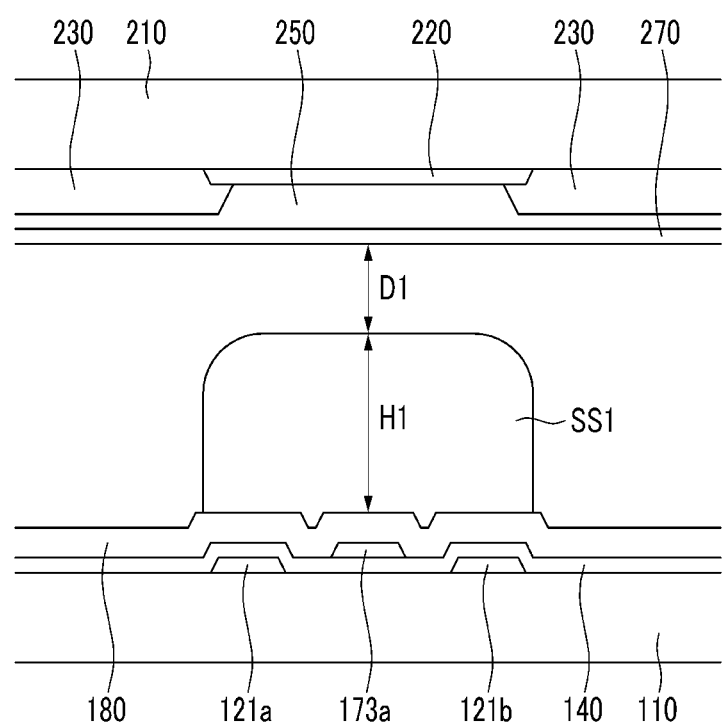
FIG. 5 is a partial cross-sectional view illustrating an exemplary embodiment of a liquid crystal display according to the invention.
Figure 6:
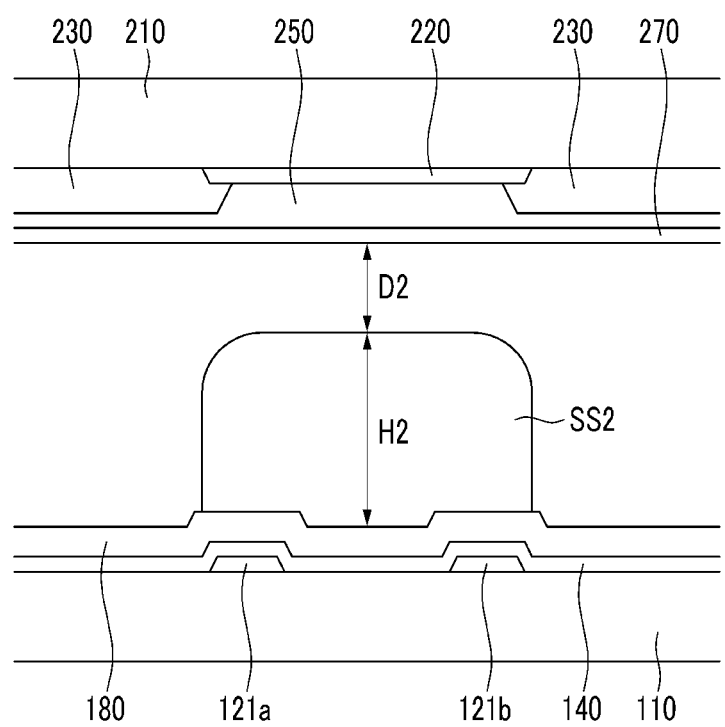
FIG. 6 is a partial cross-sectional view illustrating an exemplary embodiment of a liquid crystal display according to an exemplary embodiment of the invention.
Figure 7:
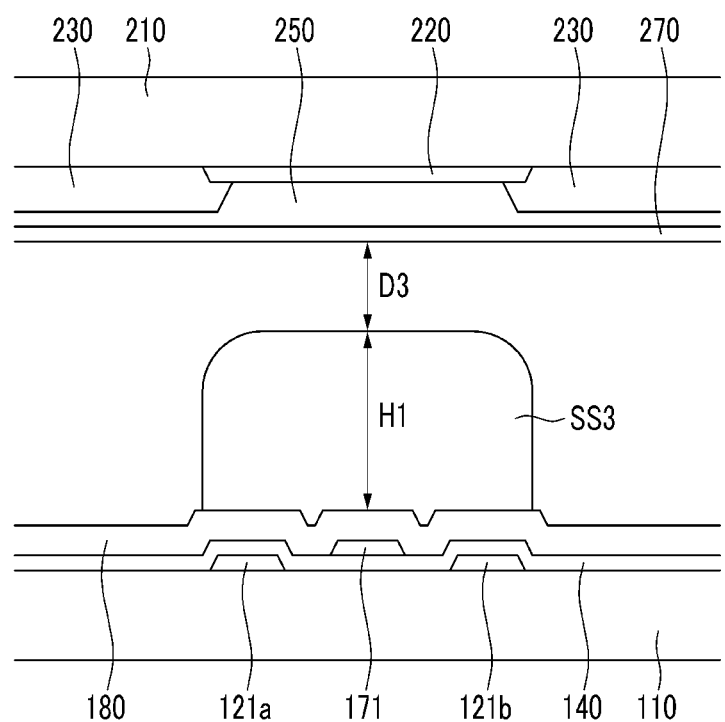
FIG. 7 is a partial cross-sectional view illustrating an exemplary embodiment of a liquid crystal display according to the invention.

FIG. 2 is a top plan view of an exemplary embodiment of a liquid crystal display according to the invention. FIG. 3 is a cross-sectional view taken along line III-III of the liquid crystal display shown in FIG. 2. FIG. 4 is a partial cross-sectional view illustrating an exemplary embodiment of a liquid crystal display according to an exemplary embodiment of the invention. FIG. 5 is a partial cross-sectional view illustrating an exemplary embodiment of a liquid crystal display according to an exemplary embodiment of the invention. FIG. 6 is a partial cross-sectional view illustrating an exemplary embodiment of a liquid crystal display according to an exemplary embodiment of the invention. FIG. 7 is a partial cross-sectional view illustrating an exemplary embodiment of a liquid crystal display according to an exemplary embodiment of the invention.

First, a structure of an exemplary embodiment of the liquid crystal display according to the invention will be described with reference to FIGS. 2 and 3.

Referring to FIGS. 2 and 3, an exemplary embodiment of the liquid crystal display includes a lower display panel 100, an upper display panel 200 disposed opposite to, e.g., facing, the lower display panel 100 and a liquid crystal layer 3 disposed between the lower display panel 100 and the upper display panel 200.

First, the lower display panel 100 will be described in detail.

The lower display panel 100 includes a first insulation substrate 110 including a transparent material such as a transparent glass, for example. A gate conductor including a plurality of gate lines 121a and 121b and a plurality of storage electrode lines 131 is disposed on the first insulation substrate 110.

The gate lines 121a and 121b extend substantially in a horizontal direction, and some of the gate lines 121a protrude downwardly or upwardly and thereby define gate electrodes 124a and 124b. The gate lines 121a and 121b include an extension part for connection with another layer or an external apparatus. The two gate lines 121a and 121b are located adjacent to each other. The uppermost gate line and the lowermost gate line may not have an adjacent gate lines thereof.

Each storage electrode line 131 is spaced apart and separated from the gate lines 121a and 121b, and includes a storage electrode 133 and a storage electrode connector 135, which are connected to each other forming a rectangle-like shape.

The storage electrode connector 135 connects two adjacent storage electrodes 133, and the storage electrode 133 is bent in the periphery of the gate electrodes 124a and 124b.

A predetermined voltage applied to a common electrode 270 of the liquid crystal display, such as a common voltage, for example, is applied to the storage electrode line 131.

The gate lines 121a and 121b and the storage electrode line 131 may include an aluminum based metal such as aluminum (Al), an aluminum alloy or the like, a silver based metal such as silver (Ag), a silver alloy or the like, a copper based metal such as copper (Cu), a copper alloy or the like, a molybdenum based metal such as molybdenum (Mo), a molybdenum alloy or the like, chromium (Cr), tantalum (Ta) or titanium (Ti). In an exemplary embodiment, the gate lines 121a and 121b and the storage electrode line 131 may include two films having different physical properties, e.g., a lower film (not shown) and an upper film (not shown) above the lower film. The upper film may include a metal having a low resistivity, for example, an aluminum based metal such as aluminum (Al), an aluminum alloy or the like, a silver based metal such as silver (Ag), a silver alloy or the like, a copper based metal such as copper (Cu), a copper alloy or the like such that a signal delay or a voltage drop of the gate lines 121a and 121b and the storage electrode line 131 is substantially reduced. In such an embodiment, the lower film may include a material having an excellent contact characteristic, for example, indium tin oxide ("ITO") and indium zinc oxide ("IZO"), such as chromium, molybdenum (Mo), molybdenum alloy, tantalum (Ta), titanium (Ti) or the like. In one exemplary embodiment, for example, the lower film and the upper film may include a chromium and aluminum-neodymium (Nd) alloy, respectively.

A gate insulating layer 140 including silicon nitride ($SiN_x$) is disposed on the gate conductors 121a, 121b and 131 including the gate lines 121a and 121b and the storage electrode line 131. The gate insulating layer 140 may have a multilayered structure including a first layer of silicon oxide (SiOx) and a second layer of silicon nitride (SiNx)

A plurality of semiconductors 154a and 154b including hydrogenated amorphous silicon ("a-Si"), polysilicon or the like is disposed on the gate insulating layer 140. The semiconductors 154a and 154b are disposed corresponding to, e.g., overlapping when viewed from a top view, the gate electrode 124a and 124b, respectively. In an exemplary embodiments, the semiconductors 154a and 154b may be oxide semiconductors.

A plurality of island-shaped ohmic contacts 163 and 165 including a material such as n+ hydrogenated amorphous silicon heavily doped with silicide or an n-type impurity is disposed on the semiconductors 154a and 154b. The contact members 163 and 165 are provided as a pair and are located on the semiconductors 154a and 154b. However, in the case where the semiconductors 154a and 154b are oxide semiconductors, the contacts 163 and 165 may be omitted.

A data conductor including a plurality of data lines 171 and a plurality of drain electrodes 175a and 175b is disposed on the ohmic contacts 163 and 165 and the gate insulating layer 140.

The data lines 171 crosses the gate lines 121a and 121b and the storage electrode connector 135 and transmit a data voltage. The data lines 171 may extend substantially in a vertical direction. Each of the data lines 171 includes an end part, a width of which extends to be connected to another layer or an external apparatus. Each of the data lines 171 includes a plurality of branch-shaped source electrodes 173a and 173b, each of the source electrodes extending toward the drain electrodes 175a and 175b in a right direction or a left direction. The source electrodes 173a and 173b are disposed opposite to, e.g., facing, the drain electrodes 175a and 175b, respectively.

The gate electrode 124a or 124b, the source electrode 173a or 173b and the drain electrode 175a or 175b define a thin film transistor ("TFT") together with the semiconductor 154a or 154b, and a channel of the thin film transistor is formed on the semiconductor 154a or 154b between the source electrode 173a or 173b and the drain electrode 175a or 175b.

The data line 171 and the drain electrodes 175a and 175b may include molybdenum, titanium, aluminium, or cupper. For example, the data line 171 and the drain electrodes 175a and 175b and may have a multilayer structure such as a triple-layered structure of a lower molybdenum film, an intermediate aluminium film, and an upper molybdenum film, or a double-layered structure including a lower titanium film and an upper cupper film. However, the data line 171 and the drain electrodes 175a and 175b may be made of various metals or conductors.

The ohmic contacts 163 and 165 are provided only between the semiconductors 154a and 154b located under the ohmic contacts 163 and 165, and the data line 171 and the drain electrode 175a and 175b located above the ohmic contacts 163 and 165, such that a contact resistance therebetween is substantially reduced.

A passivation layer 180 is disposed above the data line 171, the drain electrodes 175a and 175b and an exposed part of the semiconductors 154a and 154b. In an exemplary embodiment, the passivation layer 180 includes an organic material having a substantially effective planarization characteristic and having photosensitivity, an insulating material having low permittivity equal to or lower than permittivity 4.0 such as a-Si:C:O or a-Si:O:F, for example, formed by plasma enhanced chemical vapor deposition ("PECVD"), or an inorganic material such as silicon nitride. In an alternative exemplary embodiment, the passivation layer 180 may have a bi-layered structure including an organic material and silicon nitride. In the case where the passivation layer 180 includes an organic material, the organic material may be a color filter 230, and in this case, an additional insulating layer including silicon nitride (SiNx) may be disposed on the color filter and the color filter 230 disposed on the upper panel 200 is omitted.

A plurality of contact holes 185a and 185b is formed on the passivation layer 180 and exposes the drain electrodes 175a and 175b.

A plurality of pixel electrodes 191 including ITO or IZO is disposed on the passivation layer 180.

A pixel electrode 191 is physically or electrically connected to the drain electrodes 175a and 175b through the contact holes 185a and 185b, and receives a data voltage from the drain electrodes 175a and 175b. The pixel electrode 191 receives the data voltage and thereby generates an electric field together with the common electrode 270 receiving the common voltage, such that liquid crystal molecules of the liquid crystal layer 3 between the pixel electrode 191 and the common electrode 270 are rearranged.

In an exemplary embodiment, the pixel electrode 191 and the common electrode 270 define or form the liquid crystal capacitor, such that the applied voltage is substantially maintained even after the thin film transistor is turned off. The storage capacitor reinforces voltage maintenance of the liquid crystal capacitor, and is defined by overlapping portions of the pixel electrode 191 and the storage electrode line 131 adjacent to the pixel electrode 191.

According to another exemplary embodiment of the invention, a transparent conductive polymer and the like are used as a material of the pixel electrode 191, and an opaque reflective metal may be used for a reflective liquid crystal display.

An alignment layer (not shown) for aligning the liquid crystal layer 3 is provided on the pixel electrode 191.

Now, the upper display panel 200 will be described in detail.

The upper display panel 200 includes a second insulation substrate 210 such as transparent glass and the like. A light blocking member 220 (also referred to as a "black matrix") is disposed on the second insulation substrate 210. The light blocking member 220 prevents a light leakage between the pixel electrodes 191, and defines an opening area facing the pixel electrode 191.

A plurality of color filters 230 is disposed on the substrate 210 and the light blocking member 220. The color filter 230 is disposed overlapping substantially an entire of the opening area defined by the light blocking member 220.

An overcoat 250 including an organic material is disposed on the color filter 230 and the light blocking member 220, and the overcoat 250 protects the color filter 230 and provides a planarized surface.

The common electrode 270 including a transparent conductive material such as ITO, IZO or the like is disposed on the overcoat 250.

In the exemplary embodiment described above, the pixel electrode 191 is disposed on the lower display panel 100 and the common electrode 270 is disposed on the upper display panel 200. However, the present invention is not limited thereto. In the liquid crystal display according to another exemplary embodiment of the present invention, two filed generating electrodes such as the pixel electrode 191 and the common electrode 270 may be disposed on the same display panel such as the lower display panel 100.

Referring to FIG. 2, an exemplary embodiment of the liquid crystal display according to the invention includes a first spacer MS1, a second spacer SS1, a third spacer SS2 and a fourth spacer SS3.

The first spacer MS1, the second spacer SS1, the third spacer SS2 and the fourth spacer SS3 are disposed on the lower display panel 100.

A gap between the first spacer MS1 and the upper display panel 200 facing the first spacer MS1 may be different from a gap between the second spacer SS1, the third spacer SS2 or the fourth spacer SS3 and the upper display panel 200 facing the second spacer SS1, the third spacer SS2 or the fourth spacer SS3.

In an exemplary embodiment, the first spacer MS1 may have a different width or height from widths or heights of the second spacer SS1, the third spacer SS2 and the fourth spacer SS3, but not being limited thereto. In an alternative exemplary embodiment, the height and the width of the first spacer MS1 may be substantially the same as the heights and the widths of the second spacer SS1, the third spacer SS2 and the fourth spacer SS3.

Referring to FIGS. 2 and 4, the first spacer MS1 overlaps the thin film transistor. The thin film transistor includes the gate electrode 124b, the gate insulating layer 140, the semiconductor 154b, the source electrode 173b and the drain electrode 175b. The first spacer MS1 may be in contact with the upper display panel 200 facing the first spacer MS1.

Referring to FIGS. 2 and 5, the second spacer SS1 overlaps two gate conductors such as the two gate lines 121a and 121b and one data conductor such as a portion of the source electrode 173a. In an alternative exemplary embodiment of the liquid crystal display according to the invention, the second spacer SS1 may overlap an additional gate conductor in addition to the two gate conductors 121a and 121b. In such an embodiment, the second spacer SS1 overlaps two or more gate conductors.

Referring to FIGS. 2 and 6, the third spacer SS2 overlaps the two gate conductors 121a and 121b. In an alternative exemplary embodiment of the liquid crystal display according to the invention, the third spacer SS2 may overlap an additional gate conductor in addition to the two gate conductors 121a and 121b. In such an embodiment, the third spacer SS2 overlaps the two or more gate conductors.

The second spacer SS1 and the third spacer SS2 are disposed with a first gap D1 and a second gap D2 from the upper display panel 200 facing the second spacer SS1 and the third spacer SS2, respectively. In an exemplary embodiment, the first gap D1 and the second gap D2 may be substantially the same as each other. In an alternative exemplary embodiment, the first gap D1 and the second gap D2 may be different from each other.

Referring to FIGS. 2 and 7, in an exemplary embodiment, the fourth spacer SS3 overlaps the two gate conductors 121a and 121b and the data line 171, and the fourth spacer SS3 is disposed at a position where the two gate lines 121a and 121b and the data line 171 are insulated and intersect each other. In an alternative exemplary embodiment of the liquid crystal display according to the invention, the fourth spacer SS3 may overlap an additional gate conductor in addition to the two gate conductors 121a and 121b. In such an embodiment, the fourth spacer SS3 overlaps two or more gate conductors.

The second spacer SS1 and the third spacer SS2 are disposed with a first gap D1 and a second gap D2 from the upper display panel 200 facing the second spacer SS1 and the third spacer SS2, respectively, and the fourth spacer SS3 is disposed with a third gap D3 from the upper panel 200. In an exemplary embodiment, the first gap D1, the second gap D2 and the third gap D3 may be substantially the same as each other. In an alternative exemplary embodiment, the first gap D1, the second gap D2 and the third gap D3 may be different from each other.

Referring to FIGS. 4 to 7, a height HH1 of the first spacer MS1 (hereinafter, will be referred to as "first height") may be different from a height H1 of the second spacer SS1 (hereinafter, will be referred to as "second height"), a height H2 of the third spacer SS2 (hereinafter, will be referred to as "third height") and a height H3 of the fourth spacer SS3 (hereinafter, will be referred to as "fourth height").

In an exemplary embodiment, the first height HH1 of the first spacer MS1 is greater than the second height H1 of the second spacer SS1, the third height H2 of the third spacer SS2 and the fourth height H3 of the fourth spacer SS3, and the first spacer MS1 is in contact with the upper display panel 200, while the second spacer SS1, the third spacer SS2 and the fourth spacer SS3 may be spaced apart from the upper display panel 200 with the first gap D1, the second gap D2 and the third gap D3, respectively.

In an alternative exemplary embodiment, the first height HH1 of the first spacer MS1 may be substantially the same as or less than the second height H1 of the second spacer SS1, the third height H2 of the third spacer SS2 and the fourth height H3 of the fourth spacer SS3. In such an embodiment, the first spacer MS1 is configured to overlap the thin film transistor having a relatively long height, and the second spacer SS1, the third spacer SS2 and the fourth spacer SS3 overlap the gate conductors 121a and 121b and the data conductors 171 and 173a having relatively short heights. Accordingly, the first spacer MS1 is in contact with the upper display panel 200 when the first height HH1 of the first spacer MS1 is substantially the same as or less than the second height H1 of the second spacer SS1, the third height H2 of the third spacer SS2 and the fourth height H3 of the fourth spacer SS3, while the second spacer SS1, the third spacer SS2 and the fourth spacer SS3 may be spaced apart from the upper display panel 200 with the first gap D1, the second gap D2 and the third gap D3, respectively.

In an exemplary embodiment, the width of the first spacer MS1 may be wider or narrower than the width of the second spacer SS1, the width of the third spacer SS2 or the width of the fourth spacer SS3. In an alternative exemplary embodiment, the width of the first spacer MS1 may be substantially the same as the width of the second spacer SS1, the width of the third spacer SS2 or the width of the fourth spacer SS3.

In an exemplary embodiment, as described above, the second height H1 of the second spacer SS1, the third height H2 of the third spacer SS2 and the fourth height H3 of the fourth spacer SS3 may be substantially the same as each other. In such an embodiment, the width of the second spacer SS1, the width of the third spacer SS2 and the width of the fourth spacer SS3 may be substantially the same as each other. In such an embodiment, the second spacer SS1 and the fourth spacer SS3 overlap not only the gate conductors 121a and 121b, but also the data conductors 173a and 171, such that a height of a lower surface of a location where the second spacer SS1 and the fourth spacer SS3 are disposed may be greater than a lower surface of a location where the third spacer SS2 is disposed. Accordingly, even though the second height H1 of the second spacer SS1 and the fourth height H3 of the fourth spacer SS3 are substantially the same as the third height H2 of the third spacer SS2, the first gap D1 between the second spacer SS1 and the upper display panel 200 and the third gap D3 between the fourth spacer SS3 and the upper display panel 200 may be narrower than the second gap D2 between the third spacer SS2 and the upper display panel 200.

In an alternative exemplary embodiment of the liquid crystal display according to the invention, the second height H1 of the second spacer SS1 and the fourth height H3 of the fourth spacer SS3 may be less than the third height H2 of the third spacer SS2. In such an embodiment, the second spacer SS1 and the fourth spacer SS3 overlap the gate conductors 121a and 121b, and the data conductors 173a and 171, such that the height of the lower surface of a location where the second spacer SS1 and the fourth spacer SS3 are disposed may be greater than the height of the lower surface of a location where the third spacer SS2 is disposed. Accordingly, in an exemplary embodiment where the second height H1 of the second spacer SS1 and the fourth height H3 of the fourth spacer SS3 are less than the third height H2 of the third spacer SS2, the first gap D1 between the second spacer SS1 and the upper display panel 200 and the fourth gap D3 between the fourth spacer SS3 and the upper display panel 200 may be substantially the same as the second gap D2 between the third spacer SS2 and the upper display panel 200.

In an alternative exemplary embodiment of the liquid crystal display according to the invention, the second height H1 of the second spacer SS1 may be greater than the third height H2 of the third spacer SS2.

In such an embodiment, the first gap D1 between the second spacer SS1 and the upper display panel 200 may be narrower than the second gap D2 between the third spacer SS2 and the upper display panel 200.

As described above, the first spacer MS1, the second spacer SS1 and the third spacer SS2 of an exemplary embodiment of the liquid crystal display according to the invention are disposed on the lower display panel 100. In such an embodiment, where the spacer is formed on the lower display panel 100, a contact area where the spacer are in contact with the display panel facing the spacer becomes wider, and thus supporting of a cell gap by the spacer is substantially increased, such that the cell gap is substantially uniformly maintained.

Figure 8:
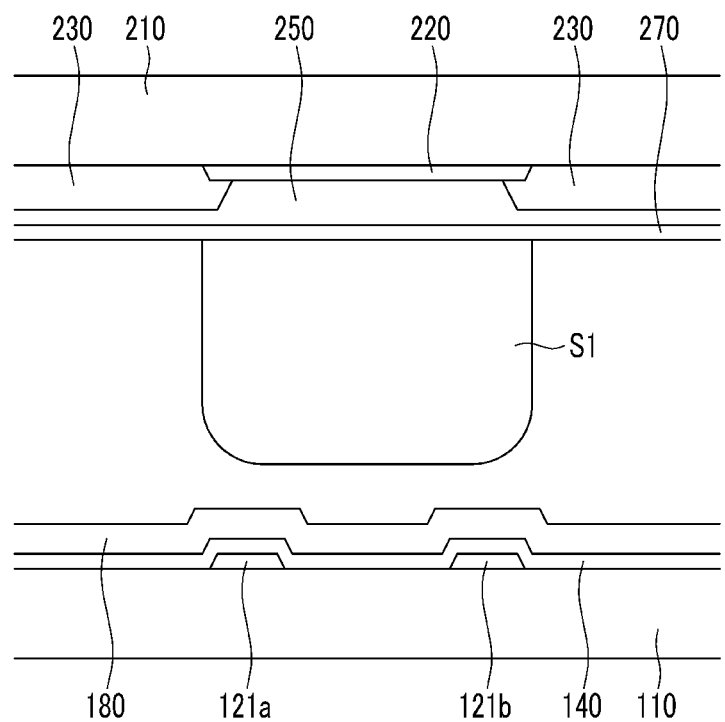
FIGS. 8 to 11 are partial cross-sectional views illustrating an exemplary embodiment of a liquid crystal display according to the invention.
Figure 9:
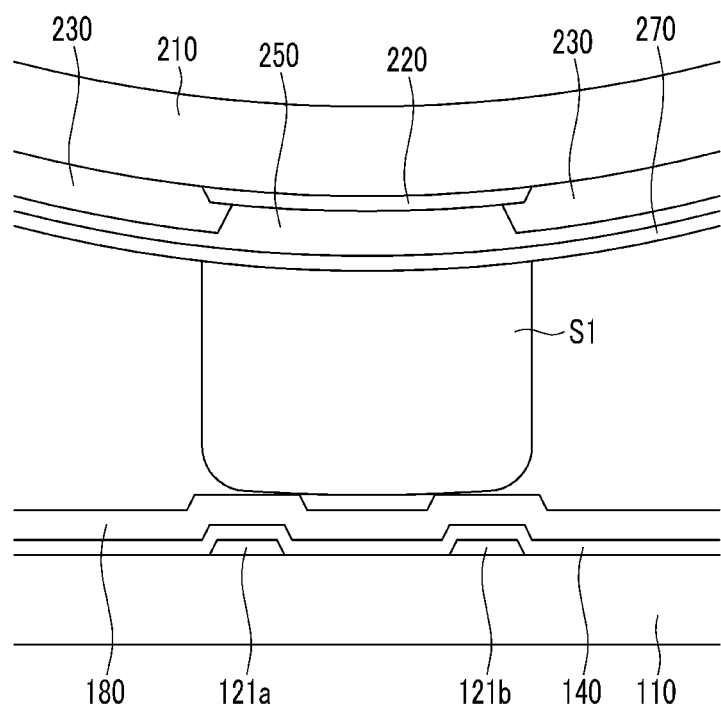
Figure 10:
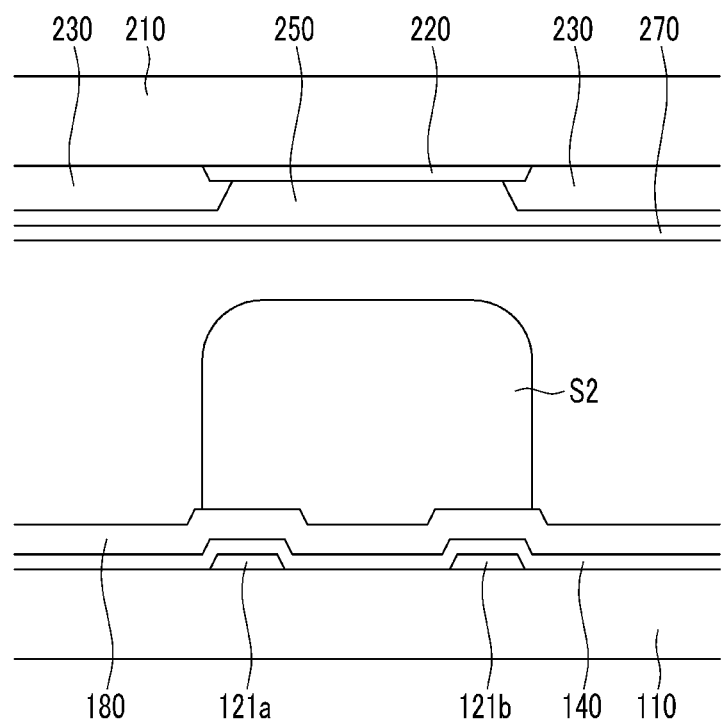
Figure 11:
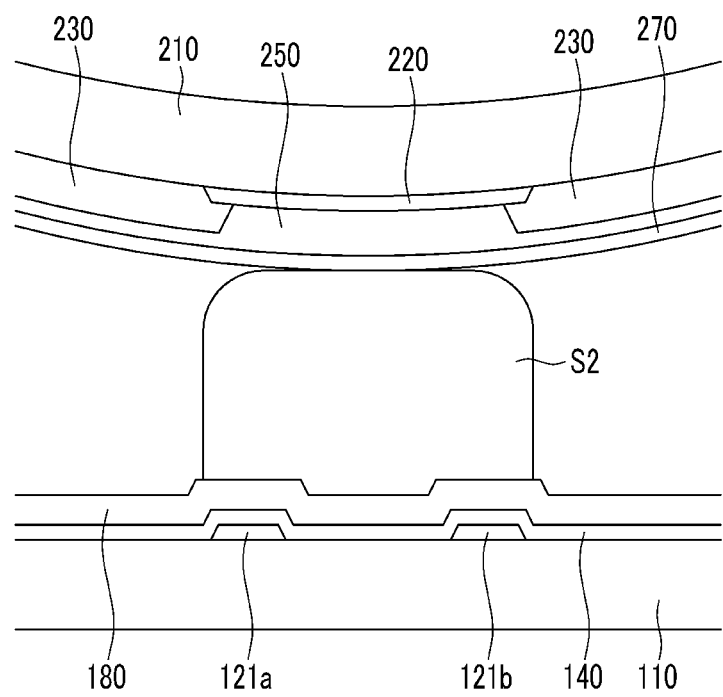

Exemplary embodiments of a liquid crystal display will be described in detail with reference to FIGS. 8 to 11. FIGS. 8 to 11 are partial cross-sectional views illustrating exemplary embodiments of a liquid crystal display according to the invention. FIGS. 8 and 9 illustrate an exemplary embodiment where the spacer is provided on the upper display panel 200, and FIGS. 10 and 11 illustrate another exemplary embodiment where the spacer is provided on the lower panel 100 according to the invention. FIGS. 8 and 10 respectively illustrate a portion of a liquid crystal display when an external pressure is not applied to the liquid crystal display, and FIGS. 9 and 11 respectively illustrate a portion of a liquid crystal display when the external pressure is applied to the liquid crystal display.

Referring to FIGS. 8 and 9, in an embodiment, where the spacer is provided on the upper display panel 200, the cell gap is maintained since the spacer S1 comes into contact with a thin film layer disposed on the lower substrate 110 facing the spacer S1 when the pressure is applied from the outside of the liquid crystal display. Since signal lines such as the gate line, the data line, the storage electrode line and the like, and a plurality of thin films such as the thin film transistor, the pixel electrode and the like are on the lower substrate 110, the thin film layer on the lower substrate 110 with which the spacer S1 comes into contact has a non-planar surface, e.g., a stepped surface. Accordingly, a contact area between the spacer S1 and the uppermost layer of the thin film layer disposed on the lower substrate 110 facing the spacer S1 is less than an area of an upper surface of the spacer S1.

Referring to FIGS. 10 and 11, in an exemplary embodiment where the spacer is on the upper display panel 200, the cell gap is maintained since the spacer S2 comes into contact with the thin film layer disposed on the upper substrate 210 facing the spacer S2 when the pressure is applied from the outside of the liquid crystal display. The number of thin film layers are on the upper substrate 210 is less than the number of the thin film layers on the lower substrate 110. Accordingly, the thin film layer on the upper surface is more planar than the thin film layer on the lower substrate 110. Therefore, the contact area between the spacer S2 and the thin film layer disposed on the upper substrate 210 facing the spacer S2 becomes substantially the same as the cross section of the spacer S2 when the spacer S2 and the thin film layer disposed on the upper substrate 210 facing the spacer S2 are in contact with each other by the external pressure.

As described above, in an exemplary embodiment where the spacer is provided on the lower display panel 100, the contact area between the spacer and the display panel 200 facing the spacer is greater than an embodiment where the spacer is provided on the upper display panel 200, such that supporting of the cell gap by the spacer is substantially improved in such an embodiment, and thus the cell gap is substantially uniformly maintained, and the smear defect is thereby substantially reduced.

In an exemplary embodiment of the liquid crystal display according to the invention, the spacers S1 and S2 overlap the gate conductor, the data conductor and the like which are parts of the gate lines 121a and 121b and the data line 171.

In a liquid crystal display, permittivity of an organic insulator constituting the spacers S1 and S2 may be lower than permittivity of the liquid crystal layer 3. In an exemplary embodiment, portions of the gate lines 121a and 121b and the data line 171 disposed on the lower display panel 100 overlap the spacers S1 and S2 having low permittivity, such that a parasitic capacity, which may be formed between the signal line disposed on the lower display panel 100 and the common electrode 270 disposed on the upper display panel 200, is substantially reduced.

In an exemplary embodiment, the spacers S1 and S2 overlap the gate conductor and the data conductor, which are parts of the gate lines 121a and 121b and the data line 171 disposed on the lower display panel 100, such that the cell gap of the liquid crystal display is substantially uniformly maintained without disposing the spacers S1 and S2 on a display area where the pixel electrode 191 is disposed. Accordingly, in such an embodiment, the cell gap is substantially uniformly maintained without reducing the aperture ratio of the liquid crystal display. In such an embodiment, the display quality is effectively prevented from being deteriorated due to unevenness of a size of the display area by disposing the spacer in a part of the display area and not disposing the spacer in other areas, for example.

Then, an alternative exemplary embodiment of a liquid crystal display according to the invention will be described with reference to FIGS. 12 and 13.

Figure 12:
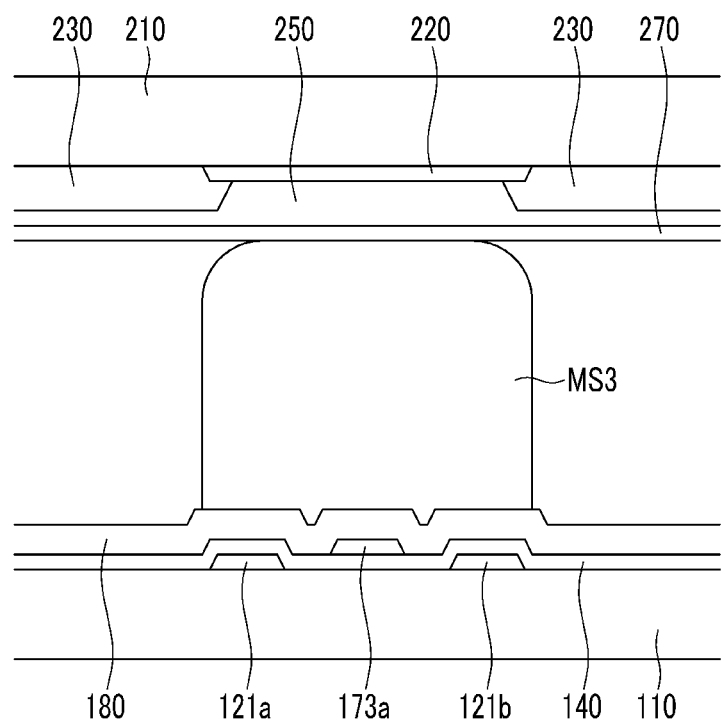
FIG. 12 is a partial cross-sectional view illustrating an alternative exemplary embodiment of a liquid crystal display according to the invention.
Figure 13:
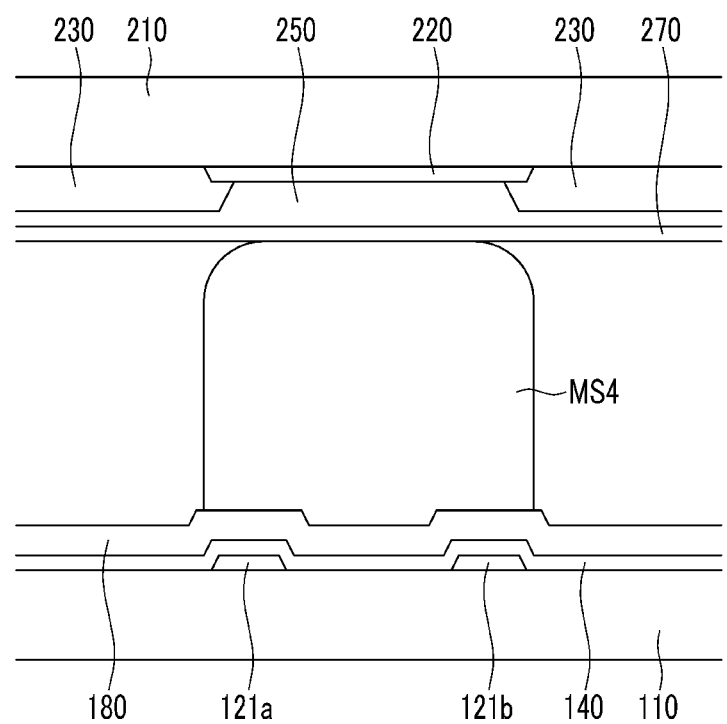
FIG. 13 is a partial cross-sectional view illustrating a part of a liquid crystal display according to another exemplary embodiment of the invention.

FIG. 12 is a partial cross-sectional view of an alternative exemplary embodiment of a liquid crystal display according to the invention, and FIG. 13 is a partial cross-sectional view of an alternative exemplary embodiment of a liquid crystal display according to the invention.

In an alternative exemplary embodiment, the liquid crystal display may further include a fifth spacer MS3 and a sixth spacer MS4.

Referring to FIG. 12, the fifth spacer MS3 overlaps the two gate conductors 121a and 121b such as the two gate lines 121a and 121b and the one data conductor 173a such as the part of the source electrode 173a. In an alternative exemplary embodiment of the liquid crystal display according to the invention, the fifth spacer MS3 may overlap an additional gate conductor in addition to the two gate conductors 121a and 121b. In such an embodiment, the fifth spacer MS3 overlaps two or more gate conductors. The fifth spacer MS3 is configured to be in contact with the upper display panel 200.

Referring to FIG. 13, the sixth spacer MS4 overlaps the two gate conductors 121a and 121b. In an alternative exemplary embodiment of the liquid crystal display according to the invention, the sixth spacer MS4 may overlap an additional gate conductor in addition to the two gate conductors 121a and 121b. In such an embodiment, the sixth spacer MS4 overlaps two or more gate conductors. The sixth spacer MS4 is configured to be in contact with the upper display panel 200.

In an exemplary embodiment, the fifth spacer MS3 and the sixth spacer MS4 may have different widths or heights, but not being limited thereto. In an alternative exemplary embodiment, the fifth spacer MS3 and the sixth spacer MS4 may have substantially the same width or height.

Other features of the liquid crystal display of FIGS. 12 and 13 are substantially the same as the exemplary embodiments described above with reference to FIGS. 1 to 11.

Hereinafter, another alternative exemplary embodiment of the liquid crystal display according to the invention will be described with reference to FIGS. 14 to 17.

Figure 14:
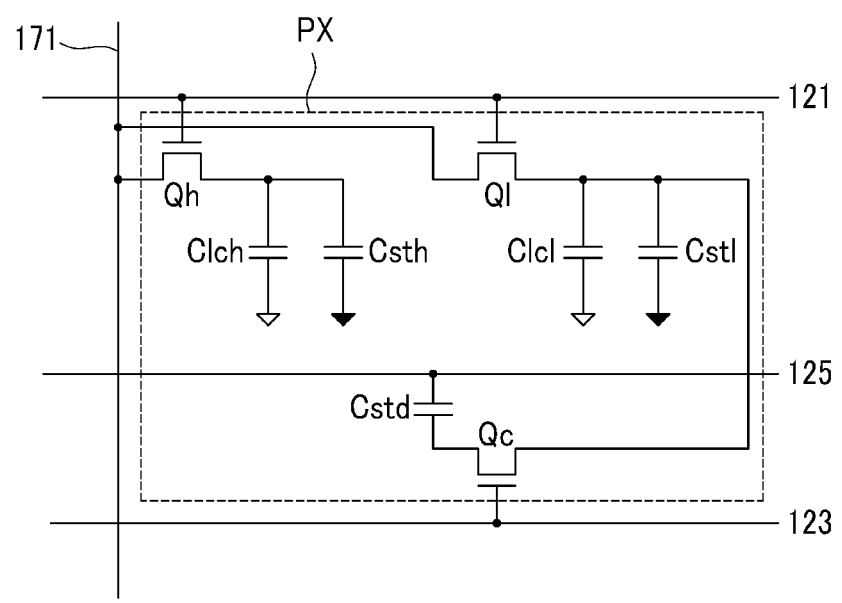
FIG. 14 is a circuit diagram of an alternative exemplary embodiment of a liquid crystal display according to the invention.
Figure 15:
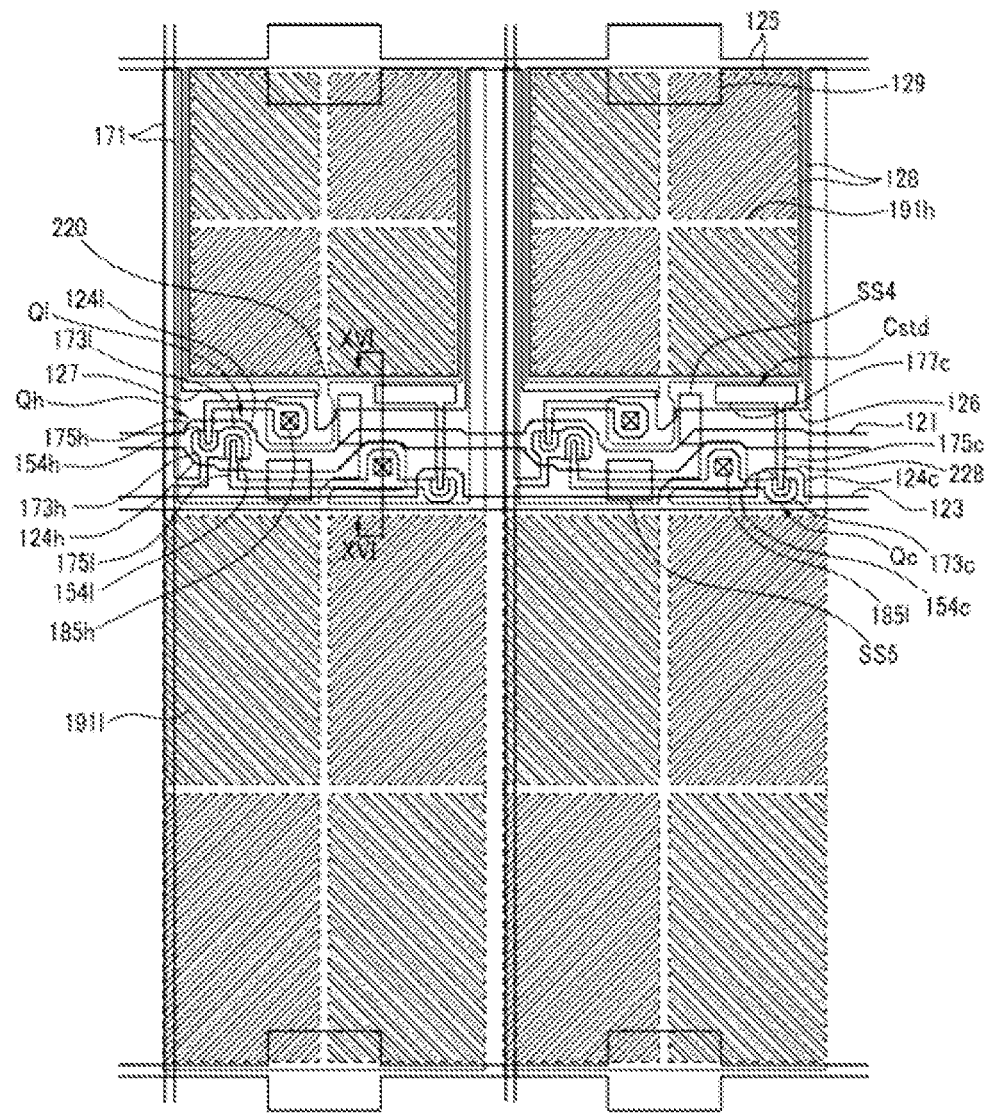
FIG. 15 is a top plan view of an alternative exemplary embodiment of a liquid crystal display according to the invention.
Figure 16:
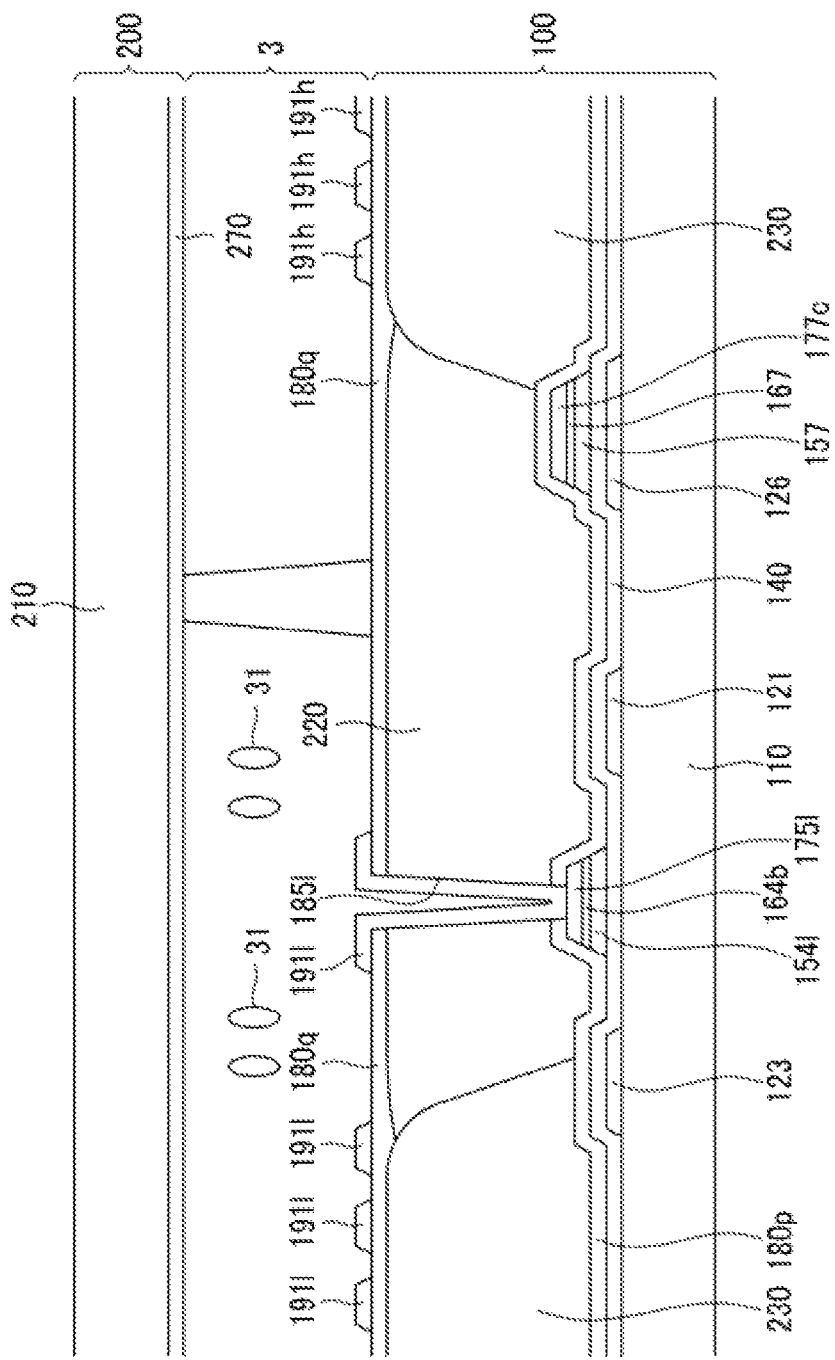
FIG. 16 is a partial cross-sectional view illustrating an alternative exemplary embodiment of a liquid crystal display according to the invention.
Figure 17:
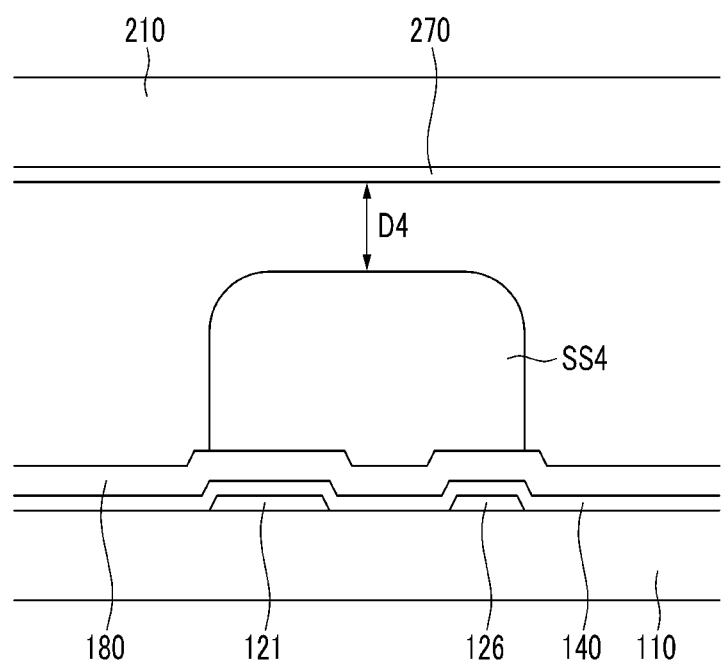
FIG. 17 is a partial cross-sectional view illustrating an alternative exemplary embodiment of a liquid crystal display according to the invention.
Figure 18:
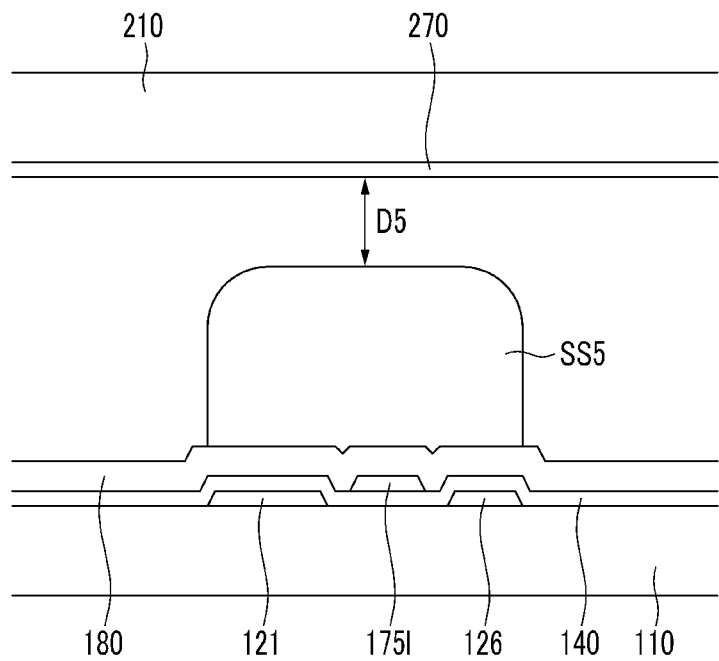
FIG. 18 is a partial cross-sectional view illustrating an alternative exemplary embodiment of a liquid crystal display according to the invention.

FIG. 14 is a circuit diagram of another alternative exemplary embodiment of a liquid crystal display according to the invention, FIG. 15 is a top plan view of another alternative exemplary embodiment of a liquid crystal display according to the invention, and FIG. 16 is a cross-sectional view taken along line XVI-XVI of the liquid crystal display of FIG. 15. FIG. 17 is a partial cross-sectional view of another alternative exemplary embodiment of a liquid crystal display according to the invention. FIG. 18 is a partial cross-sectional view of another alternative of a liquid crystal display according to the invention.

First, referring to FIG. 14, an exemplary embodiment of the liquid crystal display according to the invention includes signal lines including a gate line 121, a capacity electrode line 125, a step-down gate line 123 and a data line 171, and pixels PX connected to the signal lines.

The pixel PX includes first, second and third switching devices Qh, Ql and Qc, first and second liquid crystal capacitors Clch and Clcl, first and second storage capacitors Csth and Cstl, and a step-down capacitor Cstd.

The first and second switching devices Qh and Ql are connected to the gate line 121 and the data line 171, respectively, and the third switching device Qc is connected to the step-down gate line 123.

The first and second switching devices Qh and Ql are three terminal devices such as the thin film transistor, for example, provided in the lower display panel 100. Hereinafter, the first, second and third switching devices Qh, Ql and Qc are also referred to as first, second and third thin film transistors, respectively. Control terminals thereof are connected to the gate lines 121, input terminals thereof are connected to the data lines 171, and output terminals thereof are connected to the first and second liquid crystal capacitors Clch and Clcl and the first and second storage capacitors Csth and Cstl, respectively.

The third switching device Qc is the three terminal device such as the thin film transistor, for example, provided in the lower display panel 100. A control terminal thereof is connected to the step-down gate line 123, an input terminal thereof is connected to the second liquid crystal capacitor Clcl, and an output terminal is connected to the step-down capacitor Cstd.

Then, the liquid crystal display shown in FIG. 14 will be described in greater detail with reference to FIGS. 15 and 16.

An exemplary embodiment of a liquid crystal display includes the lower display panel 100 and the upper display panel 200, which are disposed opposite to, e.g., facing, each other, a liquid crystal layer 3 between the lower and upper display panels 100 and 200, and a pair of polarizers (not shown) attached to outer surfaces of the liquid crystal layer 3 and the lower and upper display panels 100 and 200.

First, the lower display panel 100 will be described.

The lower panel 100 includes an insulation substrate 110. A plurality of gate conductors including a plurality of gate lines 121, a plurality of step-down gate lines 123 and a plurality of capacity electrode lines 125 are disposed on the insulation substrate 110.

The gate line 121 and the step-down gate line 123 extend substantially in a horizontal direction, and transfer a gate signal. The gate line 121 includes a first gate electrode 124h and a second gate electrode 124l protruding upwardly and downwardly, and the step-down gate line 123 includes a third gate electrode 124c protruding upwardly. The first gate electrode 124h and the second gate electrode 124l are connected to each other defining an expanded portion of a gate line 121.

The capacity electrode line 125 also extends substantially in the horizontal direction, and transfers a predetermined voltage such as the common voltage, for example. The capacity electrode line 125 includes the storage electrode 129 protruding upwardly and downwardly, a pair of vertical parts 128 extending downwardly to be substantially perpendicular to the gate line 121 and a horizontal part 127 connecting ends of the pair of vertical parts 128. The horizontal part 127 includes a downwardly expanded capacity electrode 126.

A gate insulating layer 140 is disposed on the gate conductors 121, 123 and 125.

A plurality of semiconductors 154h, 154l and 154c, which may include amorphous or crystalline silicon, for example, is disposed on the gate insulating layer 140. The plurality of semiconductors 154h, 154l and 154c includes first and second semiconductors 154h and 154l which extend toward the first and second gate electrodes 124h and 124l and are connected to each other, and a third semiconductor 154c connected to the second semiconductor 154l. An extended portion of the third semiconductor 154c defines a fourth semiconductor 157.

A plurality of ohmic contacts 167 is disposed on the plurality of semiconductors 154h, 154l and 154c. A first ohmic contact (not shown) is disposed on the first semiconductor 154h, and a second ohmic contact (not shown) and a third ohmic contact 164b are disposed on the second semiconductor 154l and the third semiconductor 154c, respectively. An extended portion of the third ohmic contact 164b defines a fourth ohmic contact 167. In an alternative exemplary embodiment, the ohmic contact may be omitted. In one exemplary embodiment, for example, the semiconductors 154h, 154l and 154c include oxide semiconductors, and the ohmic contact is omitted.

A data conductor including a plurality of data lines 171, a plurality of first drain electrodes 175h, a plurality of second drain electrodes 175l and a plurality of third drain electrodes 175c are disposed on the ohmic contact 167 and the gate insulating layer 140.

The data line 171 transfers the data signal, and extends substantially in the vertical direction and crossing the gate line 121 and the step-down gate line 123. Each data line 171 includes a first source electrode 173h and a second source electrode 173l extending toward the first gate electrode 124h and the second gate electrode 124l.

Each of the first drain electrode 175h, the second drain electrode 175l and the third drain electrode 175c includes a wide end and a bar-shaped end. The bar-shaped ends of the first drain electrode 175h and the second drain electrode 175l are partially surrounded by the first source electrode 173h and the second source electrode 173l. An extended portion of the wide end of the second drain electrode 175l defines a third source electrode 173c. The wide end 177c of the third drain electrode 175c overlaps the capacity electrode 126 and forms the step-down capacitor Cstd, and the bar-shaped end is partially surrounded by the third source electrode 173c.

The first/second/third gate electrode 124h/124l/124c, the first/second/third source electrode 173h/173l/173c and the first/second/third drain electrode 175h/175l/175c collectively define first/second/third thin film transistor Qh/Ql/Qc, respectively, together with the first/second/third island-shaped semiconductor 154h/154l/154c, and the channel of the thin film transistor is formed in each semiconductor 154h/154l/154c between corresponding source electrode 173h/173l/173c and drain electrode 175h/175l/175c.

The semiconductors 154h, 154l and 154c have substantially the same planar shape as the data conductors 171, 175h, 175l and 175c, and the ohmic contact 167 under the data conductors 171, 175h, 175l and 175c except for channel areas between the source electrodes 173h, 173l and 173c, and the drain electrodes 175h, 175l and 175c. In an exemplary embodiment, the semiconductors 154h, 154l and 154c have exposed parts which are not covered by the data conductors 171, 175h, 175l and 175c as well as the parts between the source electrodes 173h, 173l and 173c, and the drain electrodes 175h, 175l and 175c.

A lower passivation layer 180p, which may include an inorganic insulating material such as silicon nitride or silicon oxide, for example, is disposed on the data conductors 171, 175h, 175l and 175c, and the exposed parts of the semiconductors 154h, 154l, and 154c.

A color filter 230 is provided on the lower passivation layer 180p. The color filter 230 is disposed covering substantially an entire area of the layer below except for areas corresponding to the first thin film transistor Qh, the second thin film transistor Ql, the third thin film transistor Qc. In an exemplary embodiment, the color filter 230 may be elongated in the vertical direction along between the adjacent data lines 171. Each color filter 230 may express one of primary colors such as three primary colors including red, green and blue, for example.

A light blocking member 220 is disposed on an area which is not occupied by the color filter 230 and disposed on a part of the color filter 230. The light blocking member 220 is also referred to as a black matrix, and effectively prevents a light leakage.

An upper passivation layer 180q is disposed on the color filter 230 and the light blocking member 220. The upper passivation layer 180q effectively prevents the color filter 230 and the light blocking member 220 from lifting and suppresses contamination of the liquid crystal layer 3 due to the organic material such as a solvent flowing from the color filter 230, thereby effectively preventing a defect such as an afterimage that may occur in driving a screen.

A plurality of first contact holes 185h and a plurality of second contact holes 185l to expose the wide end of the first drain electrode 175h and the wide end of the second drain electrode 175l, respectively, are formed through the lower passivation layer 180p, the light blocking member 220 and the upper passivation layer 180q.

A plurality of pixel electrodes is disposed on the upper passivation layer 180q.

Referring to FIG. 16, each pixel electrode includes a first subpixel electrode 191h and a second subpixel electrode 191l, which are separated from each other by two gate lines 121 and 123 interposed therebetween, and are disposed above and under the pixel area based on the gate lines 121 and 123 such that the first subpixel electrode 191h and the second subpixel electrode 191h are adjacent in a column direction.

The capacity electrode 126 and the extension part 177c of the third drain electrode 175c overlap each other with the gate insulating layer 140 and the semiconductor layers 157 and 167 interposed therebetween such that the step-down capacitor Cstd is thereby defined. In another exemplary embodiment of the invention, the semiconductor layers 157 and 167 disposed between the capacity electrode 126 and the extension part 177c of the third drain electrode 175c constituting the step-down capacitor Cstd may be omitted.

A lower alignment layer (not shown) is disposed on the pixel electrode 191l and 191h and the exposed upper passivation layer 180q. The lower alignment layer may be a vertical alignment layer.

Now, the upper display panel 200 will be described.

The upper display panel 200 includes an insulation substrate 210. A common electrode 270 is disposed on the insulation substrate 210. An upper alignment layer (not shown) is disposed on the common electrode 270. The upper alignment layer may be the vertical alignment layer.

Polarizers (not shown) are disposed on outer surfaces of the lower and upper display panels 100 and 200. In an exemplary embodiment, transmissive axes of the two polarizers are perpendicular to each other and one of the two transmissive axes is substantially parallel to the gate line 121.

In an exemplary embodiment, the liquid crystal layer 3 has negative dielectric anisotropy, and a liquid crystal molecule 31 of the liquid crystal layer 3 is oriented such that a longitudinal axis thereof is substantially perpendicular to the surfaces of the two display panels 100 and 200 in a state where no electric field is generated in the liquid crystal layer 3. Accordingly, incident light is blocked without passing through the crossed polarizers in the state where no electric field is generated in the liquid crystal layer 3.

As described above, in an exemplary embodiment, the first subpixel electrode 191h and the second subpixel electrode 191l receiving the data voltage generate the electric field together with the common electrode 270 of the common electrode display panel 200, such that the liquid crystal molecule 31 of the liquid crystal layer 3 oriented to be substantially perpendicular to the surfaces of the pixel and common electrodes 191l, 191h and 270 lies in a direction parallel with the surfaces of the pixel and common electrodes 191l, 191h and 270 in the state where no electric field is generated in the liquid crystal layer 3, and luminance of the light passing through the liquid crystal layer 3 is different according to the extent that the liquid crystal molecule 31 lies.

In the exemplary embodiment described above, the pixel electrode 191 is disposed on the lower display panel 100 and the common electrode 270 is disposed on the upper display panel 200. However, the present invention is not limited thereto. In the liquid crystal display according to another exemplary embodiment of the present invention, two filed generating electrodes such as the pixel electrode 191 and the common electrode 270 may be disposed on the same display panel such as the lower display panel 100.

Referring to FIGS. 17 and 18, an exemplary embodiment of a liquid crystal includes a seventh spacer SS4 and an eighth spacer SS5. In such an embodiment, the liquid crystal display may include the first spacer MS1 as in the exemplary embodiment described with reference to FIGS. 2 and. 4.

Referring to FIG. 17 together with FIG. 15, the seventh spacer SS4 is disposed in a position where the gate line 121 and the capacity electrode 126 overlap each other. In an exemplary embodiment, the seventh spacer SS4 may overlap at least a part of the step-down gate line 123. In such an embodiment, the seventh spacer SS4 overlaps at least two gate conductors.

The seventh spacer SS4 is disposed spaced apart from the upper display panel 200 with a fourth gap D4.

Referring to FIG. 18 together with FIG. 15, the eighth spacer SS5 overlaps the gate line 121, the step-down gate line 123 and the second drain electrode 175l. In an exemplary embodiment, the eighth spacer SS5 may overlap at least a part of the capacity electrode line 125. In such an embodiment, the eighth spacer SS5 overlaps at least two gate conductors and the data conductor.

The eighth spacer SS5 is disposed spaced apart from the upper display panel 200 with a fifth gap.

In an exemplary embodiment, the fourth gap D4 and the fifth gap D5 may be substantially the same as each other, but not being limited thereto. In an alternative exemplary embodiment, the fourth gap D4 and the fifth gap D5 may be different from each other. In an exemplary embodiment, heights or widths of the seventh spacer SS4 and the eighth spacer SS5 may substantially the same as each other, but not being limited thereto. In an alternative exemplary embodiment, heights or widths of the seventh spacer SS4 and the eighth spacer SS5 may be different from each other.

While the preferred exemplary embodiments of the invention have been described in detail, it will be understood by those skilled in the art that various modifications may be made therein and other equivalent exemplary embodiments may be possible. Accordingly, the scope of the invention is not limited thereto, and various modifications and improvements by those skilled in the art using a basic concept of the invention defined in the appended claims are also included in the scope of the invention.

What is claimed is:

1. A liquid crystal display comprising:
   a first insulation substrate;
   a first gate conductor disposed on the first insulation substrate and in a same layer as a gate line;
   a second gate conductor disposed on the first insulation substrate and in the same layer as the gate line;
   a gate insulating layer disposed on the first gate conductor and the second gate conductor;
   a data conductor disposed on the gate insulating layer and in a same layer as a data line;
   a thin film transistor disposed on the first insulation substrate;
   a spacer disposed on the first insulation substrate and overlapping the first gate conductor and the second gate conductor; and
   a first spacer disposed on the first insulation substrate and overlapping the thin film transistor and having different heights or widths from that of the spacer.

2. The liquid crystal display of claim 1, further comprising:
   a second substrate disposed opposite to the first insulation substrate,
   wherein the first spacer is in contact with surfaces of a plurality of thin films disposed on the second substrate.

3. The liquid crystal display of claim 1, wherein
   the spacer overlaps the data conductor.

4. The liquid crystal display of claim 3, further comprising:
   a third spacer disposed on the first insulation substrate,
   wherein the third spacer overlaps the first gate conductor and the second gate conductor.

5. The liquid crystal display of claim 4, wherein
   the height of the first spacer is greater than the height of the spacer.

6. The liquid crystal display of claim 5, wherein
   the width of the first spacer is substantially the same as the width of the spacer.

7. The liquid crystal display of claim 5, wherein
   the height of the spacer is greater than a height of the third spacer.

8. The liquid crystal display of claim 7, wherein
   the width of the spacer is substantially the same as a width of the third spacer.

9. The liquid crystal display of claim 4, wherein
   the height of the first spacer is substantially the same as the height of the spacer.

10. The liquid crystal display of claim 9, wherein
    the width of the first spacer is different from the width of the spacer.

11. The liquid crystal display of claim 9, wherein
    the height of the spacer is substantially the same as a height of the third spacer.

12. The liquid crystal display of claim 11, wherein
    the width of the spacer is different from a width of the third spacer.

13. The liquid crystal display of claim 4, further comprising:
    a plurality of pixels disposed substantially in a matrix form,
    wherein the first gate conductor comprises a first gate line,
    the second gate conductor comprises a second gate line, and
    the first gate line and the second gate line are disposed between two adjacent pixel rows.

14. The liquid crystal display of claim 13, wherein
    the data conductor comprises a part of a source electrode of a switching element connected to the data line.

15. The liquid crystal display of claim 14, further comprising:
    a third gate conductor disposed on the first insulation substrate and in the same layer as the gate line,
    wherein the spacer overlaps the third gate conductor.

16. The liquid crystal display of claim 1, wherein
    the spacer overlaps the data conductor.

17. The liquid crystal display of claim 16, further comprising:
    a third spacer disposed on the first insulation substrate,
    wherein the third spacer overlaps the first gate conductor and the second gate conductor.

18. The liquid crystal display of claim 17,
    wherein the height of the first spacer is greater than the height of the spacer.

19. The liquid crystal display of claim 18, wherein
    the width of the first spacer is substantially the same as the width of the spacer.

20. The liquid crystal display of claim 18, wherein the height of the spacer is greater than a height of the third spacer.

21. The liquid crystal display of claim 20, wherein
    the width of the spacer is substantially the same as a width of the third spacer.

22. The liquid crystal display of claim 17, wherein the height of the first spacer is substantially the same as the height of the spacer.

23. The liquid crystal display of claim 22, wherein
    the width of the first spacer is different from the width of the spacer.

24. The liquid crystal display of claim 22, wherein
    the height of the spacer is substantially the same as a height of the third spacer.

25. The liquid crystal display of claim 24, wherein
    the width of the spacer is different from a width of the third spacer.

26. The liquid crystal display of claim 17, further comprising:
    a plurality of pixels disposed substantially in a matrix form,
    wherein the first gate conductor comprises a first gate line,
    the second gate conductor comprises a second gate line, and
    the first gate line and the second gate line are disposed between two adjacent pixel rows.

27. The liquid crystal display of claim 26, wherein
    the data conductor comprises a part of a source electrode of a switching element connected to the data line.

28. The liquid crystal display of claim 27, further comprising:
    a third gate conductor disposed on the first insulation substrate and in the same layer as the gate line,
    wherein the spacer overlaps the third gate conductor.

29. A liquid crystal display comprising:
    a first insulation substrate;
    a first gate conductor disposed on the first insulation substrate and in a same layer as a gate line;
    a second gate conductor disposed on the first insulation substrate and in the same layer as the gate line;
    a gate insulating layer disposed on the first gate conductor and the second gate conductor;
    a data conductor disposed on the gate insulating layer and in a same layer as a data line;
    a thin film transistor disposed on the first insulation substrate;

a spacer disposed on the first insulation substrate and overlapping the first gate conductor and the second gate conductor; and a first spacer disposed on the first insulation substrate and having different heights or widths from that of the spacer, wherein the first spacer fully overlaps at least two of the first gate conductor, the second gate conductor, and the data conductor.

30. The liquid crystal display of claim 29, wherein
the height of the first spacer is greater than the height of the spacer, and
the width of the first spacer is substantially the same as the width of the spacer.

31. The liquid crystal display of claim 29, wherein
the height of the first spacer is substantially the same as the height of the spacer.

32. The liquid crystal display of claim 31, wherein
the width of the first spacer is different from the width of the spacer.

33. The liquid crystal display of claim 29, further comprising:

a plurality of pixels disposed substantially in a matrix form,
wherein the first gate conductor comprises a first gate line,
the second gate conductor comprises a second gate line, and
the first gate line and the second gate line are disposed between two adjacent pixel rows.

34. The liquid crystal display of claim 33, wherein
the data conductor is a part of a source electrode of a switching element connected to the data line.

35. The liquid crystal display of claim 34, further comprising:

a third gate conductor disposed on the first insulation substrate and in the same layer as the gate line,
wherein the spacer overlaps the third gate conductor.

36. The liquid crystal display of claim 29, further comprising:

a third gate conductor disposed on the first insulation substrate and in the same layer as the gate line,
wherein the spacer overlaps the third gate conductor.

* * * * *